(12) United States Patent
Benedictus et al.

(10) Patent No.: US 7,226,669 B2
(45) Date of Patent: Jun. 5, 2007

(54) HIGH STRENGTH ALUMINIUM ALLOY BRAZING SHEET, BRAZED ASSEMBLY AND METHOD FOR PRODUCING SAME

(75) Inventors: Rinze Benedictus, Delft (NL); Achim Burger, Hoeher-Grenzhausen (DE); Alfred Johann Peter Haszler, Vallendar (DE)

(73) Assignee: Aleris Aluminum Koblenz GmbH, Koblenz (DE)

( * ) Notice: Subject to any disclaimer, the term of this patent is extended or adjusted under 35 U.S.C. 154(b) by 0 days.

(21) Appl. No.: 10/926,287

(22) Filed: Aug. 26, 2004

(65) Prior Publication Data

US 2005/0079376 A1 Apr. 14, 2005

Related U.S. Application Data

(60) Provisional application No. 60/499,008, filed on Sep. 2, 2003.

(30) Foreign Application Priority Data

Aug. 29, 2003 (EP) .................................. 03077724

(51) Int. Cl.
B32B 15/20 (2006.01)
B23K 20/04 (2006.01)
B23K 35/00 (2006.01)
C22F 1/053 (2006.01)
C22C 21/00 (2006.01)

(52) U.S. Cl. ........................ 428/654; 148/523; 148/535; 228/235.3; 228/262.51; 165/905

(58) Field of Classification Search ................ 428/654; 148/535; 164/91; 29/469, 527.7
See application file for complete search history.

(56) References Cited

U.S. PATENT DOCUMENTS

| 2,821,014 | A | | 1/1958 | Miller |
| 4,146,163 | A | | 3/1979 | Anderson et al. |
| 4,146,164 | A | * | 3/1979 | Anderson et al. ............ 228/158 |
| 4,305,763 | A | | 12/1981 | Quist et al. |
| 4,317,484 | A | * | 3/1982 | Tanabe et al. ............ 165/134.1 |
| 4,828,631 | A | | 5/1989 | Ponchel et al. |
| 4,954,188 | A | | 9/1990 | Ponchel et al. |
| 5,108,520 | A | | 4/1992 | Liu et al. |
| 5,312,498 | A | | 5/1994 | Anderson |
| 5,744,255 | A | | 4/1998 | Doko et al. |
| 6,495,269 | B1 | * | 12/2002 | Haszler et al. ............ 428/610 |
| 2002/0037426 | A1 | | 3/2002 | Yamada et al. |
| 2003/0062143 | A1 | * | 4/2003 | Haszler et al. ............ 428/654 |

FOREIGN PATENT DOCUMENTS

| EP | 0587274 | | 3/1994 |
| EP | 0799667 | | 10/1997 |
| EP | 0823305 | | 2/1998 |
| EP | 0829552 | | 3/1998 |
| EP | 1175954 | | 1/2002 |
| GB | 2114601 | | 8/1983 |
| JP | 55161044 | | 12/1980 |
| JP | 59-143040 | * | 8/1984 |
| JP | 62-287053 | * | 12/1987 |
| JP | 63-162833 | * | 7/1988 |
| JP | 64-047829 | * | 2/1989 |
| JP | 02-037991 | * | 2/1990 |
| JP | 02-037992 | * | 2/1990 |
| JP | 05125477 | | 5/1993 |
| JP | 05-331580 | * | 12/1993 |
| JP | 08-260087 | * | 10/1996 |
| JP | 09176767 | | 7/1997 |
| JP | 63-227753 | * | 9/1998 |

OTHER PUBLICATIONS

H. Engstrom et al., Brazing. 18th International conference. Abstracts., "Multilayer Clad Aluminum Material With Improved Brazing Properties", pp. 242-243, vol. 68, 1987.

* cited by examiner

*Primary Examiner*—John J. Zimmerman
(74) *Attorney, Agent, or Firm*—Stevens, Davis, Miller & Mosher, LLP

(57) ABSTRACT

The present invention a high strength aluminium alloy brazing sheet, comprising an Al—Zn core layer and at least one clad layer, the core layer including the following composition (in weight percent):

| | |
|---|---|
| Zn | 1.2 to 5.5 |
| Mg | 0.8 to 3.0 |
| Mn | 0.1 to 1.0 |
| Cu | <0.2 |
| Si | <0.35 |
| Fe | <0.5 | optionally one or more of:

| | |
|---|---|
| Zr | <0.3 |
| Cr | <0.3 |
| V | <0.3 |
| Ti | <0.2 |
| Hf | <0.3 |
| Sc | <0.5, | the balance aluminium and incidental elements and impurities. The clad layer includes an Al—Si based filler alloy and is applied on at least one side of the core layer. The invention relates furthermore to a brazed assembly including such brazing sheet, to the use of such brazing sheet and to method for producing an aluminium alloy brazing sheet.

29 Claims, 2 Drawing Sheets

HIGH STRENGTH ALUMINIUM ALLOY BRAZING SHEET, BRAZED ASSEMBLY AND METHOD FOR PRODUCING SAME

CROSS-REFERENCE TO RELATED APPLICATIONS

This claims priority under 35 USC Section 119 from European patent application serial number 03077724.7 filed with the EPO on Aug. 29, 2003 and U.S. Provisional Patent Application No. 60/499,008 filed on Sep. 2, 2003, both of which are incorporated herein by reference in their entirety.

FIELD OF THE INVENTION

The present invention relates to an aluminium alloy brazing sheet for brazing which has high strength and improved brazing properties, to a brazed assembly comprising such brazing sheet, to the use of such brazing sheet and to a method for producing an aluminium alloy brazing sheet. More specifically, the present invention relates to a high strength multi-layer clad aluminium alloy material with improved brazing properties, comprising an interlayer between cladding and core, thereby improving corrosion resistance and reducing penetration of silicon and magnesium during brazing. The present invention also relates to a method for roll cladding or cast cladding the multi-layer clad brazing sheet.

DESCRIPTION OF THE RELATED ART

It is known in the art to use aluminium alloy brazing sheet for use, for example, in heat exchangers, oil coolers, inter coolers, evaporators or condensers of automobiles or other vehicles or applications using heat exchangers. Conventionally, these assemblies are manufactured from brazing sheets for brazing, using Al—Mn based aluminium alloys or Al—Mg—Si based aluminium alloys as a core material and Al—Si based aluminium alloys, typically of the AA4xxx-series alloys, as a clad brazing filler material for conventional brazing applications. Once these brazing sheets are assembled to e.g., a heat exchanger for automobiles, a cooling medium or a heating medium is charged through the assembly. Hence, it is crucial to prevent leakage of the assembly such as a heat exchanger while at the same time reducing the weight and size of such assemblies. Therefore, recent developments showed assemblies made from brazing sheets which were improved to reduce the size, weight and cost by decreasing the material thickness and changing the structure of the heat exchanger.

To improve the brazing quality and durability properties of the heat-treatable alloys of the brazing sheet a multi-layer clad aluminium material was developed, see H. Engström and L.-O. Gullman, "A Multilayer Clad Aluminium Material with Improved Brazing Properties", 18$^{th}$ International AWS Brazing Conference, of Mar. 24–26, 1987 in Chicago. In this paper it is proposed to use an interlayer between the braze cladding and the core layer in order to increase the corrosion resistance. Furthermore, the results showed that silicon penetration along grain boundaries of the core layer was significantly delayed in such multilayered material compared to standard "core-braze"-material and more silicon remained in the clad layer and the penetration depth was reduced.

JP-09176767 discloses an aluminium brazing sheet for vacuum brazing comprising a core layer with the following composition (in weight %): Cu 0.10 to 0.80, Mn 0.30 to 1.5, Ti 0.01 to 0.20, the balance aluminium with inevitable impurities, a brazing filler layer having a composition consisting of (in weight %): Si 5.0 to 15, Mg 0.30 to 2.5, the balance aluminium with inevitable impurities as well as an intermediate sacrificial corrosion layer composed of a 7xxx-type aluminium alloy containing at least (in weight %) 2.0–5.0 Zn.

EP-0823305-A2 discloses a brazing sheet with good corrosion resistance for use in heat exchangers comprising a core layer with the following composition (in weight %): Cu 0.15–0.35, Mn 0.50–1.6, Mg 0.05–0.50, Ti 0.06–0.30, the remainder aluminium and unavoidable impurities, a clad layer comprising an Al—Si—Mg type cladding material and an intermediate layer with (in weight %) Mn: 0.50–1.2, the remainder aluminium and unavoidable impurities as well as Mg: 0.05–1.20 as an option, thereby also disclosing the addition of Zn in an amount of (in weight %) 1.0–5.0. These multi-layered brazing sheets showed tensile properties after brazing of 140 MPa to 165 MPa.

EP-0799667-A1 discloses an aluminium alloy brazing sheet for brazed heat exchangers comprising a core layer with the following composition (in weight %): Zn 0.05 to 1.2 (optionally), Mn 0.50 to 1.5, Si$\leq$0.60, Fe$\leq$0.70, the balance aluminium and inevitable impurities, wherein the inevitable impurities are restricted to 0.60 wt % or below of Si and 0.70 wt % or below of Fe. Furthermore, such brazing sheet incorporates a clad layer of the Al—Si based filler alloy type and an intermediate layer comprising aluminium and inevitable impurities which are limited to a total amount of 1.0 wt %. The intermediate layer has a pitting potential which is lower than that of the core layer so that the intermediate layer can be used as a sacrificial layer to deflect the corrosion path.

EP-1175954-A1 discloses a multi-layer aluminium alloy brazing sheet with a core layer comprising the following composition (in wt. %): Cu 0.20 to 1.0, Mn 0.30 to 1.5, Mg$\leq$0.30, Si 0.30 to 1.3, Fe$\leq$0.20, the balance aluminium and inevitable impurities, a brazing filler material being formed on one surface of the core material comprising an Al—Si based aluminium alloy and a cladding material which is formed on the other side of the core material and which contains (in wt. %): Mg 2.0 to 3.5, Zn 0.50 to 2.0, Si$\leq$0.20, the balance aluminium and inevitable impurities.

Furthermore, it is disclosed that it is not preferred to add Mg to the core material, even though the adding of Mg improves the strength of the brazing sheet, since in a NOCOLOK (registered trade mark) flux brazing method, the brazing property of a brazing sheet in which magnesium is added to a core material is significantly degraded. During brazing the magnesium penetrates to the surface of the clad brazing layer and effects the NOCOLOK flux salt and the flux salt ameliorates the brazing properties within the furnace.

US-2002/0037426-A1 discloses an aluminium alloy brazing sheet for a heat exchanger having a four-layered structure with a core material, a clad layer with a filler alloy of an Al—Si alloy and a sacrificial anode material for an intermediate layer (interlayer) of an Al—Zn alloy wherein the core alloy is composed of (in wt. %): Cu 0.05–0.50, Mn 0.05–2.0, Fe 0.20–0.80, Si 0.10–0.50, the balance aluminium and unavoidable impurities, and wherein the intermediate layer is composed of a composition comprising (in wt. %): Cu 0.40–1.0, Mn 0.50–2.0, Si 0.10–0.50, Fe 0.20–0.80, the balance aluminium and unavoidable impurities.

SUMMARY OF THE INVENTION

Since it has been difficult to obtain a brazing sheet which does not only have good brazing properties and formability characteristics but also a high strength and an improved corrosion resistance it is a preferred object of the present invention to obtain these. More specifically, it is a preferred object of the present invention to increase the strength after brazing from about 50 MPa of the conventional AA3xxx-alloy to at least 100 MPa and at the same time obtaining a high incipient melting point for the core layer in order to be able to produce light brazing assemblies having less thickness and less weight.

Finally, it is a preferred object of the present invention to disclose a method for producing a high strength aluminium alloy brazing sheet and/or a brazed assembly which manufacturing costs are lower than those of conventional methods thereby using thinner materials to accomplish light weight and lower manufacturing cost as well as simultaneously producing a multiclad or multilayered aluminium material.

The present invention preferably solves one or more of the above-mentioned objectives.

A high strength aluminium-zinc alloy brazing sheet according to the present invention comprises an Al—Zn core layer and at least one clad layer, the core layer comprising the following composition (in wt. %):

| | |
|---|---|
| Zn | 1.2 to 5.5 |
| Mg | 0.8 to 3.0 |
| Mn | 0.1 to 1.0 |
| Cu | <0.2 |
| Si | <0.35 |
| Fe | <0.5, preferably <0.30 | optionally one or more selected from the group consisting of:

| | |
|---|---|
| Zr | <0.3 |
| Cr | <0.3 |
| V | <0.3 |
| Ti | <0.2 |
| Hf | <0.3 |
| Sc | <0.5, | the balance aluminium and incidental elements and impurities, each <0.05%, total <0.15%, the clad layer comprising an Al—Si based filler alloy, typically of the AA4xxx-series type having a Si-content in a range of 5 to 15 wt. %, and being placed on at least one side of the core layer.

In a further aspect of the invention there is provided a method of manufacturing such a high strength aluminium brazing sheet product.

Preferred embodiments are described in the present specification.

DETAILED DESCRIPTION OF THE PREFERRED EMBODIMENTS

As will be appreciated herein below, except as otherwise indicated, all percentages are by weight. Furthermore, alloy designations and temper designations refer to the Aluminum Association designations in Aluminum Standards and Data and the Registration Records, as published by the Aluminum Association.

It has been found that the balance of Mg to Zn is of importance. Depending on the amount of Zn the amount (in wt. %) of Mg is preferably in between $1.8 \leq [Zn]/[Mg] \leq 3.3$. Furthermore, the amount of Zn is reduced compared to regular AA7xxx-type alloys in order to increase the melting temperature for brazing applications. By reduction of Cu to amounts of less than 0.2 (in wt. %) and selecting Zn and Mg in the above identified amounts the melting temperature of the core layer of the present invention could be increased up to 620° C. Hence, it has been found that the amount (in wt. %) of Zn is preferably in a range of 3.0 to 5.0, more preferably in a range of 3.5 to 5.0, even more preferably in a range of 3.9 to 4.5, and most preferably in between 4.1 to 4.5.

Magnesium, together with Zn, improves the mechanical strength by aging precipitation of a compound $Mg_2Si$. However, an excessive amount of Mg results in penetration of Mg into the clad filler alloy and a reaction with a brazing salt flux, e.g. NOCOLOK salt. Magnesium is, however, helpful for enhancing the formability of the core material. It has been found that an amount (in weight %) of magnesium in the core layer is preferably having a upper limit of 2.5%, and more preferably is in a range of 1.2 to 2.5, preferably in a range of 1.3 to 1.95.

Manganese is an element for increasing the corrosion resistance and the strength of the core material. Since Mn adds to the mechanical strength without decreasing corrosion resistance, as opposed to Cu, it has been found that the amount (in wt. %) of Mn in the core layer is preferably having a lower limit of 0.4. The preferred upper limit for the Mn content is 0.8, more preferably 0.7, and most preferably about 0.5, that means about 0.48 to 0.52. However, too high amounts of Mn result in larger intermetallic compounds which have a negative effect on processability and corrosion resistance. Mn also makes the electric potential of the core material higher thereby assisting in improving the corrosion resistance.

Silicon and copper contribute to improving the strength of the alloy by forming a solid solution in the matrix after brazing. An intermetallic compound composed of $Mg_2Si$ is precipitated by reaction of Si with Mg from the core layer. However, the Cu content must be balanced with regard to an optional additional sacrificial interlayer since the addition of Cu increases the electric potential of the resultant alloy which becomes more noble. It is therefore preferred to select the amount (in wt. %) of each of Cu and/or Si in the core layer in a range of preferably 0.2 or less, each of these elements preferably in a range of less than 0.1.

Iron enhances the formation of large intermetallic compounds which distribute throughout the alloy thereby preventing the alloy from being cracked during forming. However, Fe refines crystal grains thereby degrading the brazing properties. Hence, the amount (in weight %) of Fe in the core layer should preferably be in a range of less than 0.5, preferably less than 0.3, and more preferably in a range of 0.12 to 0.30.

Zirconium, when added, is in a preferred embodiment in a range of 0.04 to 0.2 (in wt. %), and more preferably in a range of 0.12 to 0.17, and is believed to contribute to the control of the grain size structure. Too high levels of Zr are to be avoided, since Zr enhances the formation of intermetallic compounds thereby degrading processability of the aluminium brazing sheet and the corrosion resistance. This is equally valid for Ti which should be below 0.15 wt %, preferably about 0.03 wt %. Ti can be added also as a grain refiner for the cast structure, either as element or as known titanium boride or titanium carbide grain refiners.

The elements Cr, V, Hf and Sc can be added to assist in controlling amongst others the grain structure of the product, but they also have an effect on quench sensitivity during manufacturing of the core alloy sheet. The optimum levels of these elements depend on the processing of the core sheet, but on an individual basis the amount should not exceed the defined ranges. When two or more of these elements are used, the sum of such combined elements should preferably not exceed 0.3% (in wt. %), and more preferably it should not exceed 0.26 wt. %. Too high levels of these elements are to be avoided, since zirconium enhances the formation of intermetallic compounds thereby degrading processability of the aluminium brazing sheet and possibly also the corrosion resistance.

A preferred embodiment comprises a core layer as described and a clad layer being formed on both sides of the core layer. Such brazing sheet may be used in various applications where both sides are used for the assembly of the brazing sheet.

According to another preferred embodiment an interlayer is formed on at least one side of the core layer wherein the interlayer comprises either a sacrificial (anode) material which is less corrosion resistant than the core layer or a protective material which is more corrosion resistant than the core layer. Preferably, the interlayer comprises either an Al—Mn alloy composition of the AA3xxx-type or pure aluminium of the AA1xxx-type or an AlMgSi alloy of the AA6xxx-series type, preferably each with the addition of up to 3 wt. % Zn.

Through the use of an interlayer between the core layer and the clad layer comprising the filler material, one or more of the following advantages are obtained:

Firstly, the overall corrosion resistance can be enhanced while—at the same time—high strength can be achieved and maintained throughout the use of Zn. Thereby, it is possible to use brazing sheets with a lower thickness having a lower weight and being less expensive. With the use of an interlayer the corrosion properties of the brazing sheet according to the invention are comparable to conventional AA3xxx-type core materials or AA6xxx-type materials.

Secondly, a higher melting temperature can be obtained by using two interlayers one on each side of the core layer. The incipient melting point of a layered structure comprising a core layer with an alloy of the present invention and two interlayers as well as a clad layer on one or both sides of the layered structure diminishes or reduces the problem of a reduced melting temperature of a core material which contains more Zn.

Thirdly, the interlayer serves as a barrier layer and prevents the diffusion of Mg from the core layer to the clad layer and the diffusion of Si from the clad layer to the core layer. By such reduction of element migration throughout the layers improved properties of the brazing sheet are achieved like better brazeability and mechanical properties.

A preferred interlayer comprises an Al—Mn alloy composition comprising the following composition (in weight %):

| | |
|---|---|
| Mn | 0.8–1.5 |
| Si | ≦0.5 |
| Cu | ≦0.5 |
| Mg | ≦0.3 |
| Fe | ≦0.5 |
| Ti | ≦0.2, | the balance aluminium and incidental elements and impurities, each <0.05%, total <0.20%.

Even more preferred, the interlayer comprises zinc, in addition to or instead of manganese, preferably in a range of (in weight %) up to 3%, preferably in a range of 0.5 to 2.5, most preferably in a range of 1.0 to 1.5. The addition of zinc makes the electric potential of the sacrificial anode material less noble than that of the core alloy in order to ensure the corrosion resistance effect. The effect of adding zinc is insufficient when the amount is not enough. However, if zinc is added in a too high amount exceeding the melting point of the alloy is decreased in the direction of the brazing temperature.

It has furthermore been found that a reduction of manganese in the interlayer, thereby being partially replaced by zinc, enhances the corrosion resistance. The interlayer deflects the corrosion path thereby protecting the core layer from being effected.

According to another preferred embodiment of the present invention the interlayer is made of an AA1xxx-type alloy acting as a protective layer. Here, it is also possible to add zinc for controlling the electrical potential of such layer compared to the core layer. In general, it is advantageous to use an interlayer which is less corrosion resistant, e. g. a sacrificial interlayer which is considerably invariant to mechanical damage like holes or scratches.

According to another preferred embodiment of the invention the clad layer is formed on both sides of the core layer while the interlayer is formed on at least one side of the core layer in between the core layer and the clad layer. Since a brazing sheet has usually one side which is exposed to a corrosive atmosphere such side should contain the interlayer in between the core layer and the clad layer in order to protect the core layer from corrosion after brazing. The ratio of thickness of the core layer and the interlayer is preferably in a range of 10≦core layer/interlayer≦50, wherein the interlayer has preferably a thickness of at least 40 µm. Such thickness is advantageous for multiclad or multilayered brazing sheets of about 0.4 to 2.0 mm in total thickness.

The thickness of the core layer (in percent compared to the total thickness of the brazing sheet) is preferably in a range of 60 to 90%, the thickness of the interlayer (in percent compared to the total thickness of the brazing sheet) is preferably in a range of 5 to 25% and the thickness of the clad layer is preferably (in percent compared to the total thickness of the brazing sheet) in a range of 5 to 15%.

A brazed assembly according to the present invention comprises a brazing sheet with a core layer as described above, an interlayer on one or both sides of the core layer and a clad layer of the Al—Si-type (filler alloy) on at least one interlayer, that means on at least one side of the layered structure.

According to another embodiment of the present invention the brazed assembly comprises a clad layer on both sides of the layered structure comprising the core layer and two interlayers.

According to another preferred embodiment the assembly of the present invention has a number of brazing sheets which are superposing each other so that the interlayer which is alternatively not covered by a clad layer is facing outwardly and the superposed brazed sheets are joined together by brazing facing clad layers.

The present invention also comprises the use of a brazing sheet as described above or of an assembly as described above for a brazing application such as a heat exchanger, as for example a radiator, an oil cooler, an inter cooler, a heater core, an evaporator or a condenser or similar applications and assemblies which are produced by joining brazing sheets for forming a compact assembly, mainly for the purpose of exchanging heat.

The present invention also provides a method for producing an aluminium alloy brazing sheet having high strength and good corrosion resistance, comprising the steps of
a) casting a core ingot with the following composition comprising (in weight percent):

| | |
|---|---|
| Zn | 1.2 to 5.5 |
| Mg | 0.8 to 3.0 |
| Mn | 0.1 to 1.0 |
| Cu | <0.2 |
| Si | <0.35 |
| Fe | <0.5, preferably <0.30 | optionally one or more selected from the group consisting of:

| | |
|---|---|
| Zr | <0.3 |
| Cr | <0.3 |
| V | <0.3 |
| Ti | <0.2 |
| Hf | <0.3 |
| Sc | <0.5, | the balance aluminium and incidental elements and impurities as a core material,
b) homogenising and/or pre-heating the core ingot after casting,
c) casting a clad ingot comprising an Al—Si based filler alloy, homogenising and/or pre-heating the clad ingot after casting and hot rolling said clad ingot to a rolled clad member,
d) superposing the core ingot and the hot rolled clad member to form a layered member,
e) hot rolling the layered member and optionally cold rolling into a rolled product,
f) optionally inter-annealing between a cold rolling pass or passes,
g) optionally end-annealing, and
h) ageing the rolled, preferably by means of natural ageing, and optionally inter/end-annealed product.

It is furthermore possible to additionally cast an inter ingot (ingot for producing the interlayer) comprising either an Al—Mn alloy composition of the AA3xxx-type or pure aluminium of the AA1xxx-type or an AlMgSi alloy of the AA6xxx-type, each optionally with the addition of Zn, homogenising and/or pre-heating the inter ingot after casting and hot rolling the inter ingot to a rolled inter member (rolled sheet used as an interlayer), and superposing the core ingot, the inter member and the hot rolled clad member (rolled sheet used as a clad layer, made from another clad ingot) to form the layered member. Here, it is advisable to provide a rectangular groove in the core ingot by scalping out the groove in the size of the rolled inter member and the hot rolled clad member. Then, in the groove, a slice of rolled inter member and—on top of that—a slice of rolled clad member is placed, thereafter using the edge between the core material and clad material for weld-seaming the layered structure for hot rolling the layered member and optionally cold rolling into a rolled product.

According to another preferred embodiment of the invention a new method for producing a multi-layer brazing sheet is presented: the method comprises the production of an aluminium alloy multi-clad brazing sheet by comprising the steps of:

a) casting a multiclad ingot, thereby using a composition as described above as a centre core layer and an Al—Mn alloy composition of the AA3xxx-type or an AlMgSi alloy of the AA6xxx-type or pure aluminium of the AA1xxx-type, optionally with the addition of Zn, as an interlayer on both sides of the centre core layer, thereby forming the multiclad ingot (ingot with three layers of material, one centre core material, covered on both sides with interlayer material),
b) homogenising and/or pre-heating the multiclad ingot after casting,
c) casting a clad ingot comprising an Al—Si based filler alloy, homogenising and/or pre-heating the clad ingot after casting and hot rolling the clad ingot to a rolled clad member, and
d) superposing the multiclad ingot and the hot rolled clad member to form the layered member,
e) hot rolling the layered member and optionally cold rolling into a rolled product,
f) optionally inter-annealing between a cold rolling pass or passes,
g) optionally end-annealing, and
h) ageing the rolled, preferably natural ageing, and optionally inter/end-annealed product.

Such method has the advantage that the core ingot and the integrated interlayer on both sides of the core ingot are cast at the same time, thereby reducing the problem of the shifting of layers during hot rolling/roll cladding.

Other cladding techniques regular in the art such as spray cladding or continuous cast cladding can be applied in an analogous manner to produce the multi-layered material of the invention.

The present invention provides also a preferred method for producing a brazed assembly as described above, by heating an assembly of brazing sheets, which are superposing each other and which are produced as described above, preferably through a method for casting a clad ingot, to the brazing temperature. A typical brazing cycle comprises for example heating to a first temperature within a first time interval and to a second temperature within a second time interval, dwelling said assembly at the second temperature for a third time interval and cooling the assembly at a certain cooling rate.

As an example, the first temperature is in a range of about 500° C. to 550° C., the second temperature is in a range of about 580° C. to 600° C., the first time interval is in a range of about 8 to 12 minutes, the second time interval is in a range of about 3 to 7 minutes, the third time interval is in a range of about 2 to 4 minutes and the cooling rate is typically in a range of about 50° C./min to 70° C./min.

Various brazing processes, such as for example vacuum brazing or controlled atmosphere brazing, the latter with the use of for example NOCOLOK flux, or fluxless brazing advantageously using nickel and/or iron and/or cobalt, can be applied.

The present invention hence provides a brazing sheet which showed a core layer with a very high post-braze strength. The average post-braze strength (0.2% Proof Strength) was about 165 MPa. The AA7xxx-type core alloy, in a preferred combination with an AA3xx3-type interlayer had in the best examples a SWAAT performance of 47 days without perforations.

The grain structure of the core alloy of the present invention showed strongly elongated, recrystallized grains, the average grain size (width×length) of about 15×250 μm. The alloys showed a core in which the intermetallics were small, many intermetallics formed streaks or lines in the rolling direction. An increased amount of precipitates was formed in the interlayer area as well as in the core layer. However, in the core layer a few light streaks with less precipitates were also formed.

In the examples a decreased zinc concentration towards the surface of the core layer could be found over a depth of about 120 μm. Hence, the multiclad alloys had a significantly higher corrosion potential in the surface area caused by the higher concentrations of zinc in the bulk-core area.

BRIEF DESCRIPTION OF THE DRAWINGS

The aforementioned and other features and advantages of the brazing sheet according to the invention will become readily apparent from the following detailed description of some preferred embodiments. Some examples are shown in the appended drawings.

DETAILED DESCRIPTION OF THE PREFERRED EMBODIMENTS

Figure 1:
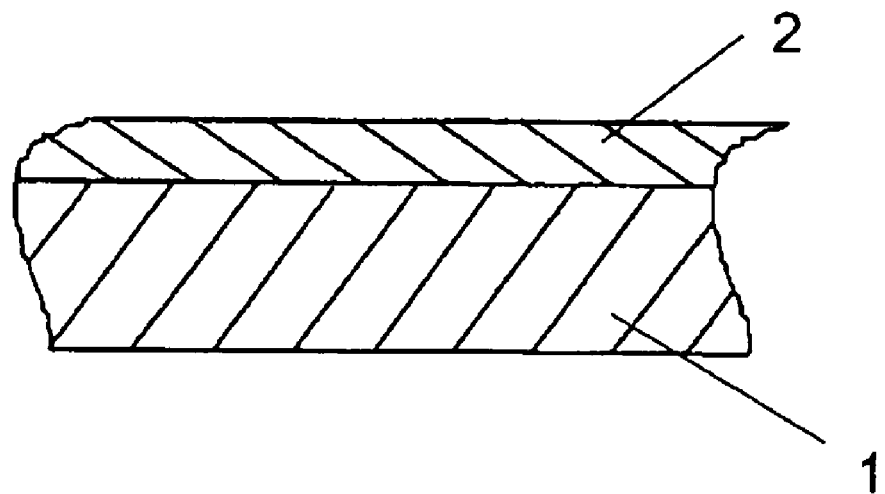
FIG. 1 shows the basic brazing sheet structure according to the invention.
Figure 2:
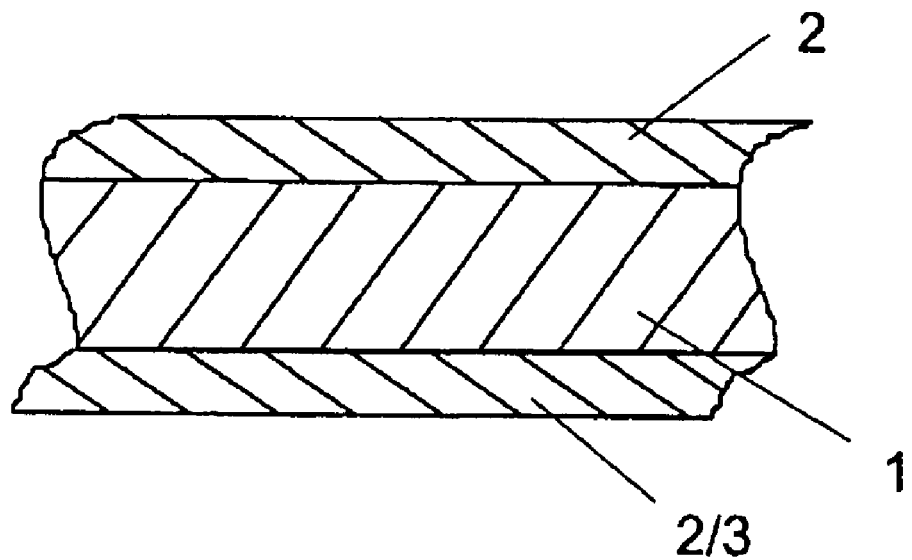
FIG. 2 shows a three-layered structure of the brazing sheet of the invention.
Figure 3:
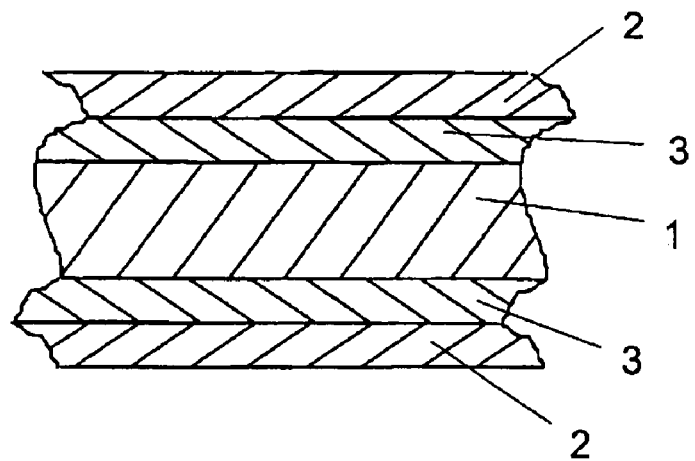
FIG. 3 shows a five-layered structure according to the invention.

FIG. 1 shows a basic structure of the brazing sheet according to the invention with a core layer 1 and a clad layer 2. As shown in FIG. 2 and FIG. 3 the core layer 1 may be clad on both sides with the clad layer 2 of the Al—Si based filler alloy type or on one side with the clad layer 2 and on the other side with an interlayer 3. The other side with the interlayer 3 is exposed to the corrosive atmosphere.

Figure 4:
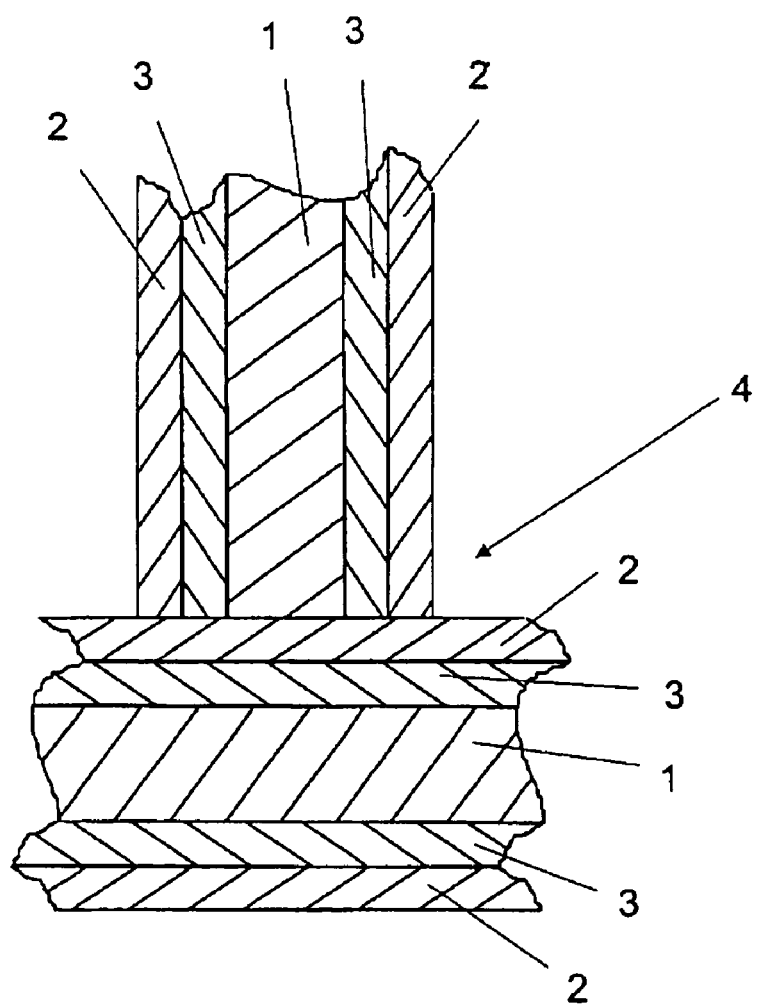
FIG. 4 shows a section of a light brazed assembly with superposed brazing sheets of the structure according to FIG. 3.

A preferred embodiment of the invention is shown in FIG. 3 and FIG. 4. The core layer 1 is embedded between two interlayers 3 which are in turn clad with clad layers 2. By producing an assembly containing the brazing sheets of the invention, the clad layers 2 accumulate at the corner 4 of two superposed brazing sheets during brazing thereby being brazed together.

EXAMPLE

On an industrial scale five different aluminium alloys have been cast into ingots for being used as an Al—Zn core layer for a high strength aluminium alloy brazing sheet having the following chemical composition as set out in Table 1.

TABLE 1

Chemical composition of the DC-cast core aluminium alloys, in wt. %, Cu 0.02%, Si 0.08%, balance aluminium and inevitable impurities.

| Alloy | Alloying Element | | | | | |
|---|---|---|---|---|---|---|
| | Zn | Mg | Mn | Zr | Fe | Ti |
| 1 | 3.50 | 1.89 | 0.50 | 0.145 | 0.26 | 0.03 |
| 2 | 4.10 | 1.64 | 0.51 | 0.148 | 0.27 | 0.03 |
| 3 | 4.50 | 1.37 | 0.49 | 0.142 | 0.27 | 0.03 |
| 4 | 4.50 | 1.90 | 0.51 | 0.139 | 0.23 | 0.03 |
| 5 | 4.10 | 1.69 | 0.50 | 0.143 | 0.25 | 0.03 |

The cast ingots were sawn into rolling blocks of about 100×80×80 mm. These blocks remained unclad. After a homogenisation these blocks were clad with a brazing filler layer of an AA4045 alloy and rolled down (to 0.4 mm/1.0 mm) by a process route comparable to a standard process route used for brazing sheet materials. The multiclad materials were then end-annealed to an O-temper condition at 350° C. for 3 h, the heat-up and cool-down rate was about 30° C./h. The mechanical properties of the multiclad alloys 1 to 4 in the O-temper condition are given in Table 2. The post-braze proof strength has been measured after the multiclad material was subjected to a typical brazing cycle.

TABLE 2

Tensile properties and strength of alloys 1 to 4 of Table 1, elongation (formability), incipient melting temperature (T-Melt) and post-braze proof strength (Rp(p.b.)).

| Core Alloy | Rp (MPa) | Rm (MPa) | A80 (%) | Rp (p.b.) (MPa) | T-Melt (° C.) |
|---|---|---|---|---|---|
| 1 | 109 | 228 | 13.0 | 139 | 613 |
| 2 | 113 | 222 | 10.2 | 148 | 618 |
| 3 | 127 | 215 | 8.5 | 135 | 619 |
| 4 | 114 | 220 | 10.4 | 174 | 609 |

Table 2 shows that in O-temper condition the alloys were reasonably strong. Also the formability of core alloys 1, 2 and 4 was acceptable (8–13%). The incipient melting point was considerably above 600° C. Higher amounts of zinc resulted in enhanced strength properties wherein higher amounts of magnesium also added strength to the alloy. The preferred target for the post-braze yield strength (0.2% PS) of 140 MPa could be met with alloys 2 and 4.

Here, it can be seen that the balance of zinc and magnesium is very important for the strength properties. Furthermore, all core alloys reached the target incipient melting point wherein silicon and magnesium are believed to have a much stronger influence on decreasing the incipient melting point than zinc. The most promising alloys were alloys No. 2 and 4 showing a very high strength of 148 MPa and 174 MPa in combination with incipient melting points of 618° C. and 609° C.

Furthermore, alloy No. 5 has been further tested in combination with two different interlayer alloys. On an industrial scale two different aluminium alloys have been cast thereby containing two different alloy compositions for the interlayer. The chemical compositions are set out in Table 3.

TABLE 3

Chemical composition of the DC-cast interlayer aluminium alloys in weight percent, balance aluminium and inevitable impurities.

| Interlayer Alloy | Alloying Element | | | | | |
|---|---|---|---|---|---|---|
| | Mn | Si | Cu | Mg | Zn | Fe |
| 1 | 1.07 | 0.19 | 0.10 | 0.02 | 0.00 | 0.31 |
| 2 | 1.05 | 0.19 | 0.10 | 0.02 | 1.34 | 0.31 |

Both alloys as shown in Table 3 were used in combination with a core layer comprising alloy No. 5 of Table 1. The post-braze mechanical properties of the various clad materials after 35 days of natural ageing have been tested and are listed in Table 4.

The incipient melting points measured by DSC, for two multiclad materials are given in Table 5. The incipient melting point has been measured on pre-brazed plate materials, in end-annealed, O-temper condition.

TABLE 4

Post-braze mechanical properties after 35 days of natural ageing, corrosion performance (SWAAT test according to ASTM G85) of the multiclad materials, in combination with various thicknesses, end of test after 50 days.

| Alloy Core/Inter | | Rp MPa | Rm MPa | A80 % | SWAAT days | Thickness mm |
|---|---|---|---|---|---|---|
| 5 | 1 | 164 | 291 | 13.2 | 14 | 0.4 |
| 5 | 2 | 159 | 284 | 14.3 | 5 | 0.4 |
| 5 | 1 | 168 | 306 | 17.0 | 47 | 1.0 |
| 5 | 2 | 168 | 304 | 17.5 | 42 | 1.0 |

TABLE 5

Incipient melting points measured by DSC.

| Alloy | | Incipient |
|---|---|---|
| Core | Interlayer | T (° C.) |
| 5 | 1 | 615 |
| 5 | 2 | 613 |

The incipient melting points of the combination of core alloy No. 5 and interlayer alloys 1 or 2 are more than sufficient. The SWAAT test results show excellent corrosion behaviour of the materials when compared to standard brazing materials. Furthermore, it has been shown that the corrosion resistance of an interlayer without zinc is better than of an interlayer comprising zinc as identified above. It appears recommendable to either use a thickness of more than 0.5 mm and/or to use interlayer alloy 1 in order to obtain the better corrosion performance. Hence, the multiclad or multilayered brazing sheet of the invention has a very high post braze strength in combination with very good corrosion properties and a relatively high incipient melting point thereby adding good brazing properties to the structure. Specifically, the post-braze strength properties of alloy No. 4 of 174 MPa is superior to most of the prior art core alloys. Hence, the multiclad layered brazing sheet of the invention has a very high post-braze strength in combination with very good corrosion properties and a relatively high incipient melting point thereby adding good brazing properties to the structure.

Having now fully described the invention, it will be apparent to one of ordinary skill in the art that many changes and modifications can be made without departing from the spirit and scope of the invention as hereon described.

The invention claimed is:

1. High strength aluminium-zinc alloy brazing sheet, comprising an Al—Zn core layer, one interlayer on each side of the core layer and a clad layer on each interlayer, said core layer comprising the following composition (in weight percent):

| Zn | 3.0 to 5.0 |
|---|---|
| Mg | 1.2 to 2.5 |
| Mn | 0.1 to 1.0 |
| Cu | <0.2 |
| Si | <0.35 |
| Fe | <0.5, | optionally one or more of:

| Zr | <0.3 |
|---|---|
| Cr | <0.3 |
| V | <0.3 |
| Ti | <0.2 |
| Hf | <0.3 |
| Sc | <0.5, | the balance aluminium and incidental elements and impurities, said clad layer comprising an Al—Si based filler alloy and being applied on at least one side of the core layer, wherein at least one of said interlayers comprises either a sacrificial anode material which is less corrosion resistant than the core layer or a protective material which is more corrosion resistant than the core layer, said sacrificial anode material or protective material comprising Zn, in addition to or instead of Mn, in a range of (in weight %) 1.0 to 2.5.

2. Brazing sheet according to claim 1, wherein the amount (in weight %) of Mn in the core layer is in a range of 0.4 to 0.8.

3. Brazing sheet according to claim 1, wherein the amount (in weight %) of Zr in the core layer is in a range of 0.04 to 0.2.

4. Brazing sheet according to claim 1, wherein said interlayer comprising said sacrificial anode material or protective material further comprises either an Al—Mn alloy composition of the AA3xxx-type or pure aluminium of the AA1xxx-type or an AlMgSi alloy of the AA6xxx-type, each optionally with the addition of up to 3% Zn.

5. Brazing sheet according to claim 4, wherein said interlayer comprising said sacrificial anode material or protective material comprises an AlMgSi alloy of the AA6xxx-type, optionally with the addition Zn.

6. Brazing sheet according to claim 1, wherein said interlayer comprising said sacrificial anode material or protective material further comprises an Al—Mn alloy composition comprising the following composition (in wt. %):

| Mn | 0.8–1.5 |
|---|---|
| Si | ≦0.5 |
| Cu | ≦0.5 |
| Mg | ≦0.3 |
| Fe | ≦0.5 |
| Ti | ≦0.2, | the balance aluminium and incidental elements and impurities.

7. Brazing sheet according to claim 6, wherein said composition of said interlayer comprises 0.5–2.5% Zn.

8. Brazing sheet according to claim 6, wherein said composition of said interlayer comprises 1.0–1.5% Zn.

9. Brazing sheet according to claim 1, wherein said clad layer is applied on both sides of the core layer, wherein at least one of said interlayers is applied on at least one side of the core layer between the core layer and the clad layer.

10. Brazing sheet according to claim 1, wherein the amount (in weight %) of Zn in the core layer is in a range of 3.5 to 5.0.

11. Brazed assembly comprising a brazing sheet according to claim 1, wherein said assembly is composed of four or five layered brazing sheet, comprising a core layer, an interlayer on each side of the core layer and a clad layer on at least one interlayer.

12. Brazed assembly according to claim 11, wherein multiple brazing sheets are superposing each other so that the interlayer which is alternatively not covered by a clad layer is facing outwardly, and the superposed brazed sheets are joined together by brazing facing clad layers.

13. A method of using a brazing sheet according to claim 1, comprising forming the brazing sheet into a brazing sheet product or brazing the sheet to be part of a brazed assembly wherein said assembly is composed of four or five layered brazing sheet, comprising a core layer, an interlayer on each side of the core layer and a clad layer on at least one interlayer.

14. High strength aluminium-zinc alloy brazing sheet according to claim 1, comprising said Al—Zn core layer and said at least one clad layer, said core layer consisting essentially of the following composition (in wt. %):

| | |
|---|---|
| Zn | 3.0 to 5.0 |
| Mg | 1.2 to 2.5 |
| Mn | 0.1 to 1.0 |
| Cu | ≦0.2 |
| Si | ≦0.35 |
| Fe | ≦0.5 | optionally one or more of:

| | |
|---|---|
| Zr | <0.3 |
| Cr | <0.3 |
| V | <0.3 |
| Ti | <0.2 |
| Hf | <0.3 |
| Sc | <0.5, | the balance aluminium and incidental elements and impurities, said clad layer comprising an Al—Si based filler alloy and being applied on at least one side of the core layer.

15. Brazing sheet according to claim 1, wherein said interlayer comprising said sacrificial anode material or protective material further comprises an Al—Mn alloy composition consisting essentially of the following composition (in wt. %):

| | |
|---|---|
| Mn | 0.8–1.5 |
| Si | ≦0.5 |
| Cu | ≦0.5 |
| Mg | ≦0.3 |
| Fe | ≦0.5 |
| Ti | ≦0.2, | the balance aluminium and incidental elements and impurities.

16. Brazing sheet according to claim 1, wherein said core layer comprises at most 4.1% Zn.

17. Brazing sheet according to claim 1, wherein said core layer comprises at least 1.64% Mg.

18. Brazing sheet according to claim 1, wherein said core layer comprises at least 0.51% Mn.

19. Brazing sheet according to claim 1, wherein said core layer comprises 0.12 to 0.30% Fe.

20. Brazing sheet according to claim 1, further comprising about 0.03% Ti.

21. Brazing sheet according to claim 1, wherein the ratio of Zn to Mg (by weight) in the composition is at least 1.8 and at most 3.3.

22. A method for producing an aluminium alloy brazing sheet having high strength and good corrosion resistance, comprising the steps of:
 a) casting a core ingot with the following composition (in weight percent):

| | |
|---|---|
| Zn | 1.2 to 5.5 |
| Mg | 0.8 to 3.0 |
| Mn | 0.1 to 1.0 |
| Cu | <0.2 |
| Si | <0.35 |
| Fe | <0.5 | optionally one or more of:

| | |
|---|---|
| Zr | <0.3 |
| Cr | <0.3 |
| V | <0.3 |
| Ti | <0.2 |
| Hf | <0.3 |
| Sc | <0.5, | the balance aluminium and incidental elements and impurities as a core material,
 b) homogenising and/or pre-heating the core ingot after casting,
 c) casting a clad ingot comprising an Al—Si based filler alloy, homogenising and/or pre-heating the clad ingot after casting and hot rolling said clad ingot into rolled clad member members,
 d) superposing said core ingot between said hot rolled clad members to form a three-layered member,
 e) hot rolling said layered member and optionally cold rolling said layered member into a rolled product,
 f) optionally inter-annealing said layered member between cold rolling passes,
 g) optionally end annealing, and
 h) ageing the rolled and optionally inter- and/or end-annealed product.

23. Method as claimed in claim 22, further comprising casting an interlayer ingot comprising either an Al—Mn alloy composition of the AA3xxx-type or pure aluminium of the AA1 xxx-type or an AlMgSi alloy of the AA6xxx-type, optionally with the addition of Zn up to 3 wt. %, homogenising and/or pre-heating the interlayer ingot after casting and hot rolling said interlayer ingot to a rolled interlayer member, and superposing said core ingot, said interlayer member and said hot rolled clad member to form said layered member.

24. Method as claimed in claim 22, wherein,
 a) casting a multiclad ingot, using a composition of the AA3xxx-type or pure addition of Zn up to 3 wt. %, as a center core layer and an Al—Mn alloy composition of the M3xxx-type or pure aluminium of the AA1 xxx-type or an AlMgSi alloy of the AA6xxx-type, optionally with the addition of Zn up to 3 wt. %, as an interlayer on both sides of the center core layer, forms said multiclad ingot, and comprising
 b) said homogenising and/or pre-heating said multiclad ingot after casting, c) said casting a clad ingot comprising an Al—Si based filler alloy, homogenising and/or pre-heating the clad ingot after casting and hot rolling said clad ingot to a rolled clad member, and d) said superposing said multiclad ingot and said hot rolled clad member to form said layered member.

25. Method according to claim 22, wherein the amount (in weight %) of Zn in the core layer is in a range of 3.0 to 5.0 and the amount (in weight %) of Mg in the core layer is in a range of 1.2 to 2.5.

26. Method according to claim 22, wherein the amount (in weight %) of Mn in the core layer is in a range of 0.4 to 0.8.

27. Method according to claim 22, wherein the amount (in weight %) of Zr in the core layer is in a range of 0.04 to 0.2.

28. Method according to claim 22, wherein the amount (in weight %) of Zn in the core layer is in a range of 3.5 to 5.0.

29. Method as claimed in claim 22, comprising end-annealing the rolled product.

* * * * *